US007912872B2

(12) United States Patent
Bayiates

(10) Patent No.: US 7,912,872 B2
(45) Date of Patent: *Mar. 22, 2011

(54) STORING AND RETRIEVING THE VISUAL FORM OF DATA

(75) Inventor: Edward L. Bayiates, Worcester, MA (US)

(73) Assignee: Nugenesis Technologies Corporation, Milford, MA (US)

( * ) Notice: Subject to any disclaimer, the term of this patent is extended or adjusted under 35 U.S.C. 154(b) by 178 days.

This patent is subject to a terminal disclaimer.

(21) Appl. No.: 12/290,461

(22) Filed: Oct. 30, 2008

(65) Prior Publication Data

US 2009/0183097 A1 Jul. 16, 2009

Related U.S. Application Data

(60) Continuation of application No. 11/387,455, filed on Mar. 23, 2006, now Pat. No. 7,467,134, which is a division of application No. 09/478,156, filed on Jan. 5, 2000, now Pat. No. 7,082,436.

(51) Int. Cl.
*G06F 7/00* (2006.01)
*G06F 17/30* (2006.01)

(52) U.S. Cl. .......................... 707/803; 707/813; 715/221
(58) Field of Classification Search .......................... None
See application file for complete search history.

(56) References Cited

FOREIGN PATENT DOCUMENTS

| JP | 10-021251 | 1/1998 |
|----|-----------|--------|
| JP | 10-293769 | 11/1998 |

*Primary Examiner* — Cam Y T Truong
(74) *Attorney, Agent, or Firm* — Muirhead and Saturnelli, LLC

(57) ABSTRACT

Data representing a visual form of data is received. The data including content data and format data indicating the manner in which the content data is to be visually represented. At least some of the content data is identified in accordance with a template, which includes one or more extraction instructions. The retrieved data may then be stored in the identified content data. Or, in response to the data, an action may be taken such as initiating a process. A template may be applied to several data files, storing visual forms of data and the information from those files may be stored in a database in association with the visual forms of data. A user may input an extraction instruction by visually identifying a region of a sample visual form of data and selecting a manner to extract the content data in reference to the identified region.

24 Claims, 15 Drawing Sheets

STORING AND RETRIEVING THE VISUAL FORM OF DATA

CROSS REFERENCE TO RELATED APPLICATIONS

This application is a continuation of U.S. patent application Ser. No. 11/387,455 filed Mar. 23, 2006 now U.S. Pat. No. 7,467,134, which is a divisional of U.S. patent application Ser. No. 09/478,156, filed Jan. 5, 2000 (U.S. Pat. No. 7,082,436), all of which are incorporated herein by reference.

BACKGROUND

This invention relates to storing the visual form of data. Computer programs generally maintain data in a variety of formats. There usually is one format that is unique, and typically proprietary, to each computer program in which raw data is stored persistently. This format usually is designed to reduce the amount of information actually stored and, in some cases, to restrict the ability of a third party to access the data. Data in this format generally is created by a "save" function of the computer program. The save function formats the raw data and stores the formatted raw data in yet another format, called a "file," that is defined by the operating system for which the computer program is designed. Data that is being processed by a computer program is stored in another format, also typically proprietary, called a "data structure," which generally is stored in volatile or working memory during execution of the computer program. A data structure usually is designed to permit the data to be processed efficiently by the computer program, while minimizing the amount of memory needed to represent the data.

With many computer programs, the most useful form of the data from the perspective of the user is its visual form, e.g., what is displayed on a computer display or what is printed. However, this form of the data often is not captured into permanent or persistent storage, unless it is printed and the printed form is electronically scanned. In particular, the file format used by a computer program often does not maintain data in a visual form for several reasons. The visual form of the data generally requires more information to be represented and can be reconstructed from raw data that requires less information to be represented. Therefore storing the visual form of the data generally is considered unnecessary.

Part of the visual form of data produced by a computer program is generated, for example, from environmental data (such as the date and time) or user selected data that is being processed, and is not recoverable from the file format, but only from the data structures of the computer program. Although some data structures represent the visual form of the data, often there is no mechanism to retain the visual form of the data other than by printing. Some operating systems permit displayed data to be copied from one computer program to another using a "cut-and-paste" operation. But this operation generally requires the other computer program to be in operation on the same machine. Some computer programs also do not have these operations available to the user. For some computer programs, the printed form of the data, not the displayed data, is most useful and this operation does not provide access to the printed data.

Even if the visual form of data from a computer program is stored, as new versions of the computer program are used, or if the computer program is no longer available, access to that data is impeded. Also, another computer program still might not be able to access the data if the data is stored in a proprietary format.

This lack of access to the visual form of the data from a computer program creates a variety of problems when this form of the data is desired for creating compound documents from multiple sources of data, particularly if the data is created, used and shared over a period of time by multiple different users with multiple different computer programs that are dispersed geographically. As a particular example, in the pharmaceutical industry, data may be acquired from many laboratory instruments in geographically dispersed laboratories over a significant period of time, and then may be combined to produce reports, for example, for regulatory compliance. The inability to centrally access an electronic visual form of the data from these instruments adds a significant cost to regulatory compliance.

SUMMARY

In one aspect, the invention features receiving data representing a visual form of data including content data and format data indicating the manner in which the content data is to be visually represented; identifying at least some of the content data in accordance with a template; and storing the identified content data.

Embodiments of this aspect of the invention may include one or more of the following features.

The data representing the visual form of data may be normalized in accordance with a displayed form of the visual form of data. The visual form of data may be characterized by a plurality of dimensions characterized by at least two coordinate systems where normalizing the data representing the visual form of data includes converting values expressed in the two coordinate systems into a common coordinate system. The common coordinate system may be the coordinate system of a displayed form of the visual form of data.

The template includes at least one extraction instruction for identifying at least some of the content data from the received data, and the extraction instruction includes information indicating location of at least some of the content data based on the common coordinate system. The data representing the visual form of data includes data in a format required by an operating system layer for outputting the visual form of data by a printer. The operating system layer may be Windows operating system and the data representing the visual form of data may be a Windows metafile.

The template includes at least one extraction instruction for identifying at least some of the content data from the received data. The visual form of data may be characterized by a plurality of dimensions characterized by a coordinate system and the extraction instruction may include information indicating location of the desired data based on the coordinate system. The visual form of data may be characterized by a plurality of dimensions and the extraction instruction may include information with respect to location of a reference marker and a direction in one of the plurality of dimensions where identifying at least some of the content data includes searching in the direction for identifying at least some of the content data in the direction.

A sample visual form of data may be displayed. Data may be received from a user indicating the location of data selected by the user in the displayed sample visual form of data, and the extraction instruction may be formed based on location data identifying the location of the data selected by the user.

The extraction instruction may stored in association with data representing the sample visual form of data.

The received data further may represent a plurality of visual forms of data where storing the identified content data further includes storing the identified content data in association with data representing a corresponding one of a plurality of visual forms of data.

In another general aspect, the invention features a graphical user interface including a region for displaying a sample visual form of data, a region enabling a user to input location data identifying a location of data selected by the user, and a region causing a computer program to form an extraction instruction using the location data identifying the location of the data selected by the user.

In another general aspect, the invention features receiving data representing a visual form of data including content data and format data indicating the manner in which the content data may be to be visually represented; identifying at least some of the content data in accordance with a template; and initiating performance of an action based on results of the identifying of at least some of the content data.

In yet another general aspect, the invention features a computer implemented technique of receiving information defining a parsing criterion including displaying a graphical user interface for displaying a multi-dimensional document containing multiple units of information; and receiving first information from a user identifying a location within the displayed document, and second information specifying a desired unit of information based on a location of the desired unit of information relative to the identified location, where the information defining the parsing criterion includes the first and second information.

Embodiments of this aspect of the invention may include one or more of the following features.

A plurality of documents can be parsed to identify units of information based on the parsing criterion. The identified units of information may be stored on a computer readable medium. The document may be parsed based on the parsing criterion to identify the desired unit of information. The identified information may be processed to arrive at new information. Information identifying at least one user-definable action to be performed on the identified information may be received.

In yet another aspect, the invention features a computer implemented technique of receiving information defining a parsing criterion including displaying a graphical user interface for displaying a multi-dimensional document containing multiple units of information; and receiving first information from a user identifying a visual marker within the displayed document, and second information defining a desired unit of information within the document by specifying a relative position of the unit of information with respect to the marker, where the information defining the parsing criterion includes the first and second information.

In yet another aspect, the invention features a computer implemented technique of receiving information defining a parsing criterion including displaying a graphical user interface for displaying a multi-dimensional document containing multiple units of information displayed in a multi-dimensional space; and receiving first information a user identifying a region within the displayed document, and second information defining a desired unit of information within the document by specifying a relative position of the unit of information with respect to the region, where the information defining the parsing criterion includes the first and second information. In some embodiments, the second information may indicate that the desired unit of information overlaps with the identified region or that the desired unit of information may be contained within the identified region.

In yet another aspect, the invention features displaying a graphical user interface for displaying a multi-dimensional document containing multiple units of information displayed in a multi-dimensional space; and receiving first information from a user defining a desired unit of information within the document by specifying a relative position of the unit of information and second information identifying an action to be executed depending on the existence or non-existence of the unit of information within the document.

In another aspect, the invention features displaying a graphical user interface for displaying a multi-dimensional document containing multiple units of information displayed in a multi-dimensional space; receiving first information from a user defining a desired unit of information within the document by specifying a relative position of the unit of information and second information identifying an action to be executed depending on the existence or non-existence of the unit of information within a selected region of the document.

All publications, patent applications, patents, and other references mentioned herein are incorporated by reference in their entirety. In case of conflict, the present specification, including definitions, will control. In addition, the methods, and examples are illustrative only and not intended to be limiting.

Other features and advantages of the invention will be apparent from the following detailed description, and from the claims.

DETAILED DESCRIPTION

Figure 1:
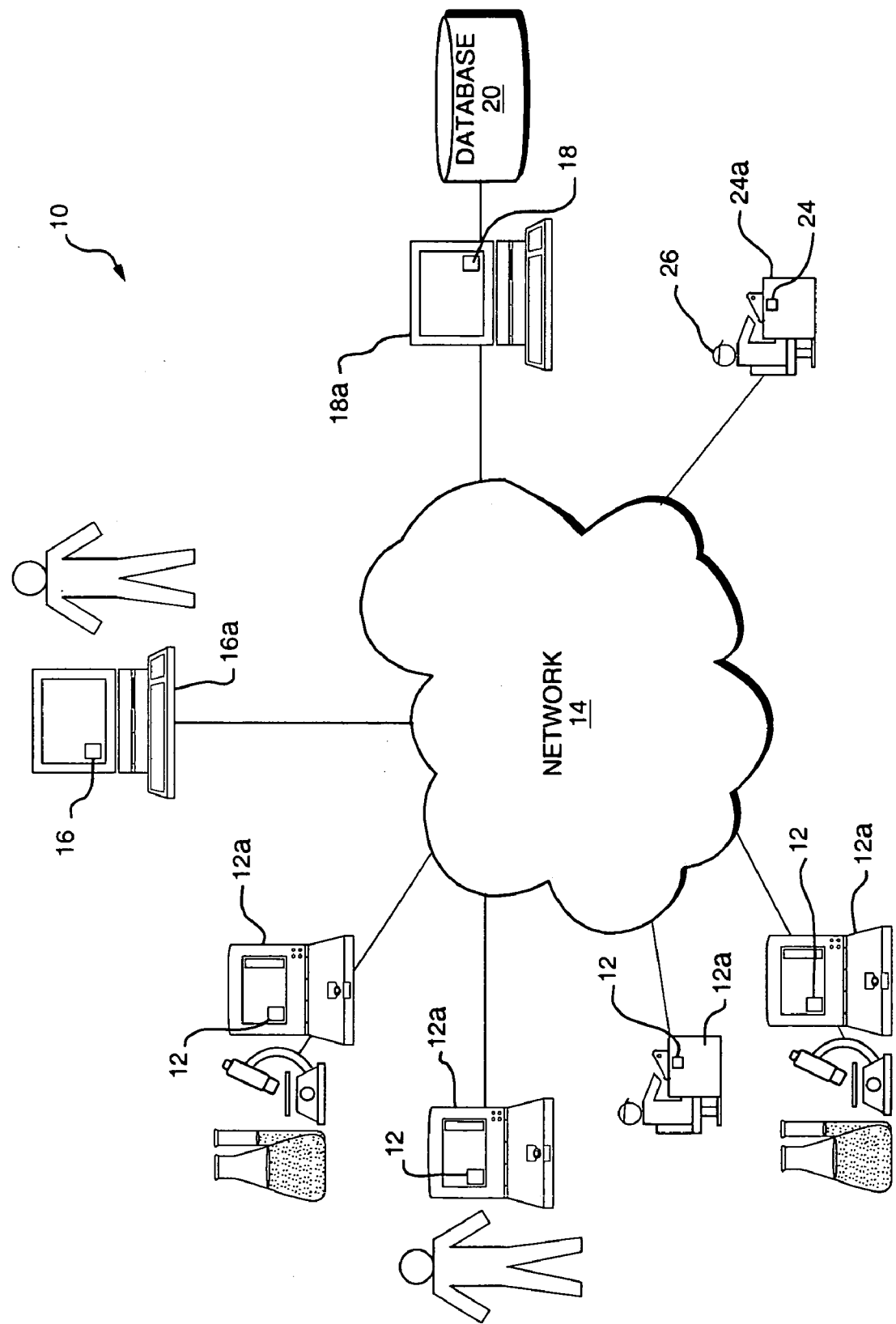
FIG. 1 is a schematic diagram illustrating an embodiment of a system for storing the visual form of data from an application into a database.

Referring to FIG. 1, system 10 includes a plurality of report generating applications 12 running on computers 12A. Computers 12 are connected through a network 14 to a computer 16A running a project manager module 16, a computer 18A running a database manager 18, and a computer 20A running a user application 20A. Database manager 18 is connected to a database 20. Each one of report generating applications 12 is capable of generating visual forms of data, typically intended for printers. In the case of computers 12 running operating systems marketed under the Windows trademark by Microsoft Corporation of Redmond, Wash., the visual forms of data are stored as Windows metafiles. Such metafiles and visual forms of data will also be referred to as reports.

Applications 12 can output the reports over network 14 to database manager 18 as described in patent application U.S. Ser. No. 09/213,019, filed Dec. 16, 1998 ("'019 application"), for example, by making function calls to the operating systems of computers 12A. The function calls cause the operating systems to create data files (for example, Windows metafiles) representing the visual forms of the data (that is, the reports). Such data file includes at least two types of data: content data which is the data to be represented visually, and format data which includes commands and other information for causing the content data to be visually represented in a particular manner. The function calls generally are provided by the operating systems in order to permit applications such as report generating applications 12 to print data to a printer. In system 10, the data generated by these applications are received by database manager 18 and stored in database 20. To increase ease and efficiency of organizing and searching through the reports stored in database 20, each report is stored in association with one or more tags. Tags are fields of data which can store data in association with the reports. As taught in the '019 application, a user may input the data in the tags.

In system 10, tags may also be generated based on operations performed on the reports in accordance with a template. A template is a collection of one or more extraction instructions for extracting data from a report. An extraction instruction is one or more commands or criteria for selecting and extracting content data (with or without associated format data) from a data file storing data representing a visual form of the data. A template may be applied to a selected batch of reports to generate tags for each one of the reports in the batch to be stored in association with each one of those records. In one embodiment, templates specifically store instructions for retrieving the data based on the visual aspects of the generated reports. Such visual aspects may include the location of the data within the report or within a selected portion of the report. The instructions may also, for example, indicate the general direction of a desired data compared to a selected reference marker in the report.

To allow a user to create or edit a template, project manager module 16 provides the user with various graphical user interfaces to input the extraction instructions. In one embodiment, project manager module 16 allows the user to select a sample or base report based on which the user may generate a template. The selected report is displayed to the user. The user may input the extraction instructions by visually indicating to the computer the location where a desired data should appear in a report. The user also may visually specify a location of a reference marker and a general direction in which a desired data should appear in a report relative to the marker. Because reports are multi-dimensional, in that data within them is not only displayed in two dimension but also in various orientations or in more than one page, then the extraction instructions may be applied in one, or more dimensions of the visual form of data.

The generated templates then can be applied by project manager module 16, or any other application program having the capability of applying templates, to a batch of reports stored in database 20 or, in realtime, as the reports are being outputted by report generating applications 12 to database manager 18.

As is apparent from the above description, system 10 can be used to integrate various component systems of large enterprises. For example, in a pharmaceutical enterprise, each one of computers 12 can be research and development computers operating within a single laboratory or multiple laboratories spread across various locations of an enterprise. By printing to a common database, database manager 18 can centrally store the reports to retrieve the information from within those reports and provide them for further processing to other application programs such as user application program 24.

Each one of computers 12A, 16A, 18A, and 24A can include a main unit connected to both an output device which displays information to a user and an input device which receives input from a user. The main unit generally includes a processor connected to a memory system via an interconnection mechanism. The input device and output device also are connected to the processor and memory system via the interconnection mechanism.

One or more output devices may be connected to the computers. Example output devices include a cathode ray tube (CRT) display, liquid crystal displays (LCD) and other video output devices, printers, communication devices such as a modem, storage devices such as a disk or tape, and audio output. One or more input devices may be connected to the computer system. Example input devices include a keyboard, keypad, track ball, mouse, pen and tablet, communication device, and data input devices such as audio and video capture devices. The invention is not limited to the particular input or output devices used in combination with the computer system or to those described herein.

Each one of the computers may be a general purpose computer system which is programmable using a computer programming language, such as C++, Java, or other language, such as a scripting language or assembly language. The computer system may also include specially programmed, special purpose hardware, or an application specific integrated circuit (ASIC). In a general purpose computer system, the processor is typically a commercially available processor, of which the series x86, Celeron, and Pentium processors, available from Intel, and similar devices from AMD and Cyrix, the 680X0 series microprocessors available from Motorola, the PowerPC microprocessor from IBM, the Alpha-series processors from Digital Equipment Corporation, and the MIPS microprocessor from MIPS Technologies are examples. Many other processors are available. Such a microprocessor executes a program called an operating system, of which windows family of operating systems including Windows NT, and Windows 95 or 98, Linux, UNIX, IX, DOS, VMS MAC OS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory CD-ROM (rewriteable), and tape are examples. The magnetic disk may be removable, known as a floppy disk, or permanent, known as a hard drive. A magnetic disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. The invention is not limited to a particular memory system. A computer readable storage medium includes a magnetic disk, a flash memory CD-ROM (rewriteable), and tape.

Various computer platforms, processors, or high-level programming languages can be used for implementation. Additionally, the computer system may be a multiprocessor computer system or may include multiple computers connected over a computer network. Each computer program modules (e.g. 12, 16, 18 and 24) in FIG. 1 may be separate modules of a computer program, or may be separate computer programs. Such modules may be operable on separate computers. Data may be stored in a memory system or transmitted between computer systems. The plurality of computers or devices may be interconnected by a communication network, such as a public switched telephone network or other circuit switched network, or a packet switched network such as an Internet protocol (IP) network. The network may be wired or wireless, and may be public or private.

Such a system may be implemented in software or hardware or firmware, or any combination thereof. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

The claims are not limited to a particular computer platform, particular processor, or particular high-level programming language. Additionally, the computer system may be a multiprocessor computer system or may include multiple computers connected over a computer network. Various possible configurations of computers in a network permit many users to participate in an auction, even if they are dispersed geographically.

Using the Windows95, Windows98 and WindowsNT operating systems, the data files or reports from report generating applications 12 representing the visual form of the data output by the operating system in response to function calls from an application to print the data is in a Windows Metafile format, according to Microsoft. A metafile is a vector image, or, a list of commands, draw objects, text, and commands to control style. Theoretically, a metafile may be used in any Windows application. A Windows metafile (WMF) is a 16-bit metafile that is supported by Windows 3.1. An enhanced metafile (EMF) is a 32-bit enhanced metafile that is supported by Windows 95, Windows 98, and Windows NT having a super set of WMF commands.

The operation of printing in the Windows operating systems and its use to capture the visual form of data from an application into a database will now be described. In order to print on a printer in a Windows environment, the printer has an associated print driver. When the printer is installed, the operating system is informed of the location of the print driver, i.e., its file name. The print driver specifies the characteristics of the printer to the operating system.

An application 12 (as in FIG. 1) permits a user to select a printer through a user interface, such as a graphical user interface with menus. The selected printer also may have various printing options that may be selected. Through a function call made by the application in response to user input, the user may invoke a user interface for the print driver to permit the user to specify user information and printing preferences. Given a selected printer, preferences and information to be printed, the application 12 issues function calls to a Graphics Device Interface (GDI-32), which is part of the Windows operating system. The GDI-32 requests the selected print driver and its user interface for information about the printer that in turn is given back to the application 12, and is retained by the GDI-32, to assist in the process of generating a correct sequence of function calls to the operating system to print the selected information.

The GDI-32 outputs data into spool files and makes function calls with the names of the spool files to the spooler process to queue the spool files for printing on their designated printers. A spool file in the Windows operating system is designated as a Windows metafile by Microsoft. A printer spool file is not a true metafile, however, because it actually contains printer setup data in addition to any referenced or embedded metafiles. In Windows95, a spool file contains the file names of any metafiles. In WindowsNT, the metafiles are embedded in the spool file. In both cases, there is one spool file per printed document, and each page of a document has a separate metafile.

The spooler process is informed about the location of a print processor associated with the selected print driver. The spooler process calls the print processor to process any spool files that the spooler process has queued for the print processor. Generally, a typical print processor receives the spool file from the spooler process 96 and converts it to a format used by the printer, such a printer control language (PCL), PostScript or other, typically proprietary, format. Instead of printing, the print processor causes the vector image data produced by the operating system to be formatted, associated with tags, and stored in a database.

More details about metafiles, print drivers, print processors, spooler processes and spool files are available through the Microsoft Developer Network and the Microsoft Development Network Library accessible through the Internet.

Database 20 and database manager 18 may be any kind of database, including a relational database, object-oriented database, unstructured database or other database. Example relational databases include Oracle 8i from Oracle Corporation of Redwood City, Calif., Informix Dynamic Server from Informix Software, Inc. of Menlo Park, Calif., DB2 from International Business Machines of Yorktown Heights, N.Y., and Access from Microsoft Corporation of Redmond, Wash. An example object-oriented database is ObjectStore from Object Design of Burlington, Mass. An example unstructured database is Notes from the Lotus Corporation, of Cambridge, Mass. A database also may be constructed using a flat file system, for example by using files with character-delimited fields, such as in early versions of dBASE, now known as Visual dBASE from Inprise Corp. of Scotts Valley, Calif., formerly Borland International Corp.

Figure 2:
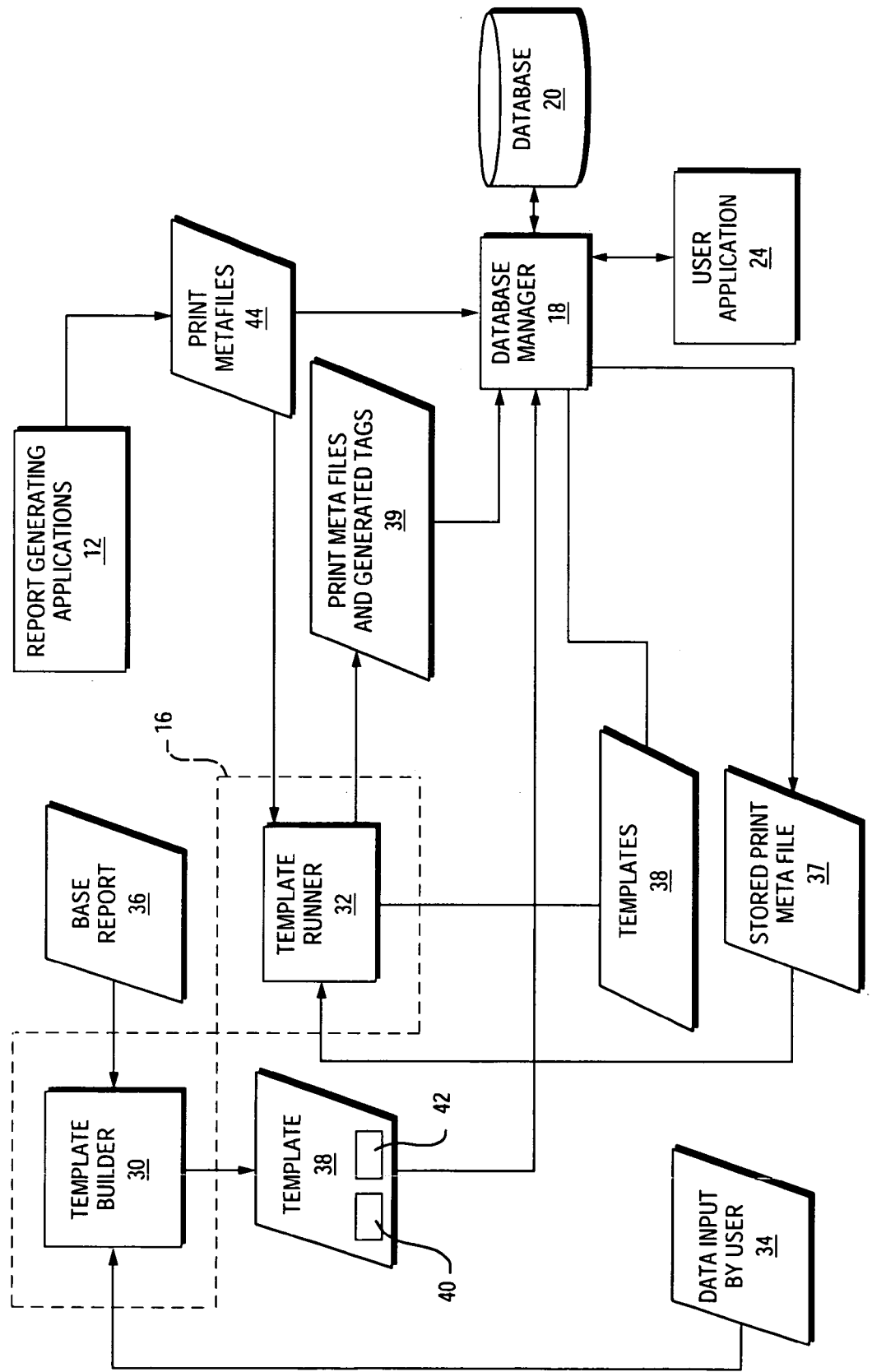
FIG. 2 is a block diagram illustrating operations of the system of FIG. 1.

Referring to FIG. 2, having generally described system 10, the structure and operation of project manager module 16 will now be described in more detail. Project manager module 16 includes two modules: a template builder module 30 and a template runner module 32. Template builder module 30 provides various GUIs (which will be described in reference to FIGS. 5-11) to obtain data 34 from the user. Using data 34 and a sample or base report 36 selected by the user, template builder module 30 creates a template 38. In one embodiment, the data structure of template 38 includes two components. One component is an edit template component 40 which includes all the information used for future editing of the template and various record keeping and security information. Another component is a runtime extraction instructions component 42 which includes the information used to apply the template to a batch of reports. After generating template 38, template builder module 30 sends template 38 to database manager 18 to be stored in database 20.

Figure 14:
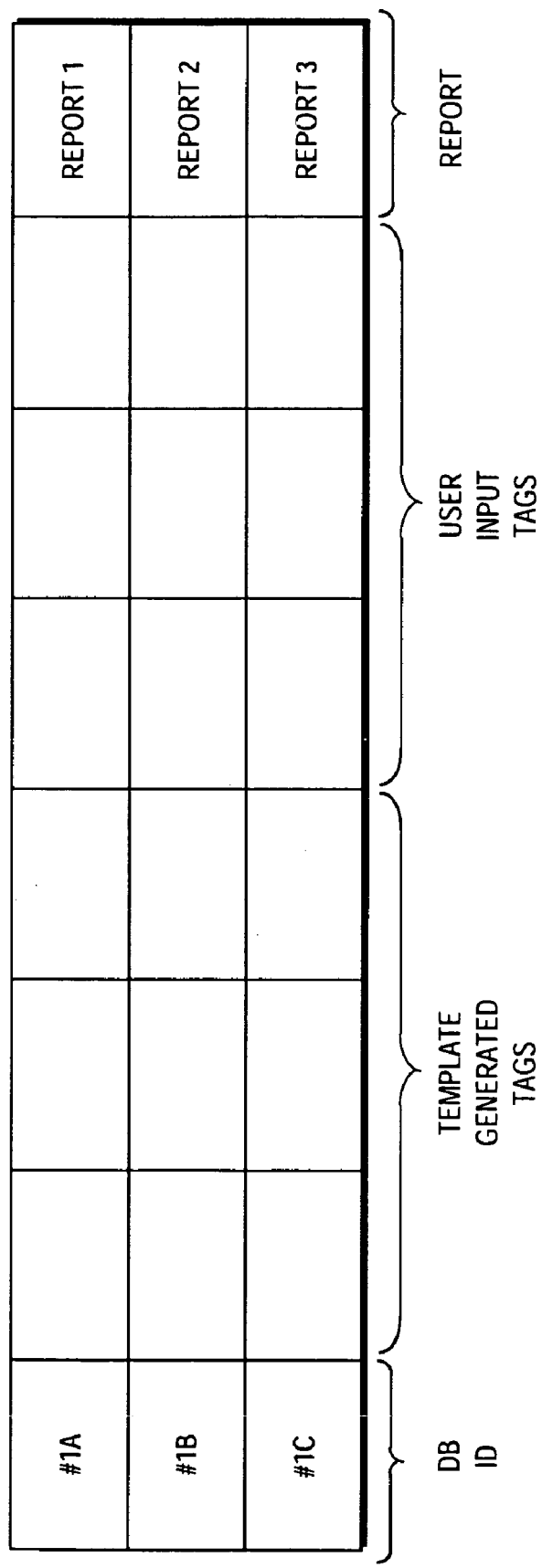
FIG. 14 is a schematic diagram of an embodiment of a data structure of a database storing reports in association with tags.

As stated above, each report generating application 12 can generate a batch of visual forms of data files 44 (that is, reports) to be stored in database 20. Reports 44 may be sent to the template runner module 32 or database manager 18. If sent to template runner module 32, template runner module 32 retrieves template 38 from database 20 through database manager 18 and applies template 38 to the batch of reports. Template runner module 32 can also retrieve a batch of reports stored in database 20 and apply template 38 to the retrieved batch of reports. By applying the template, template runner module 32 generates tags based on data content of the visual forms of data and causes them to be stored in database 20 in association with the reports (an example of the data structure of such a database is shown in FIG. 14). Template runner module 32 may also associate user input tags with the reports. The tags can then be used for searching and organizing the reports. Also, the tags may be provided, whether in association with the reports or not, for further data processing by various user applications 24.

Figure 3:
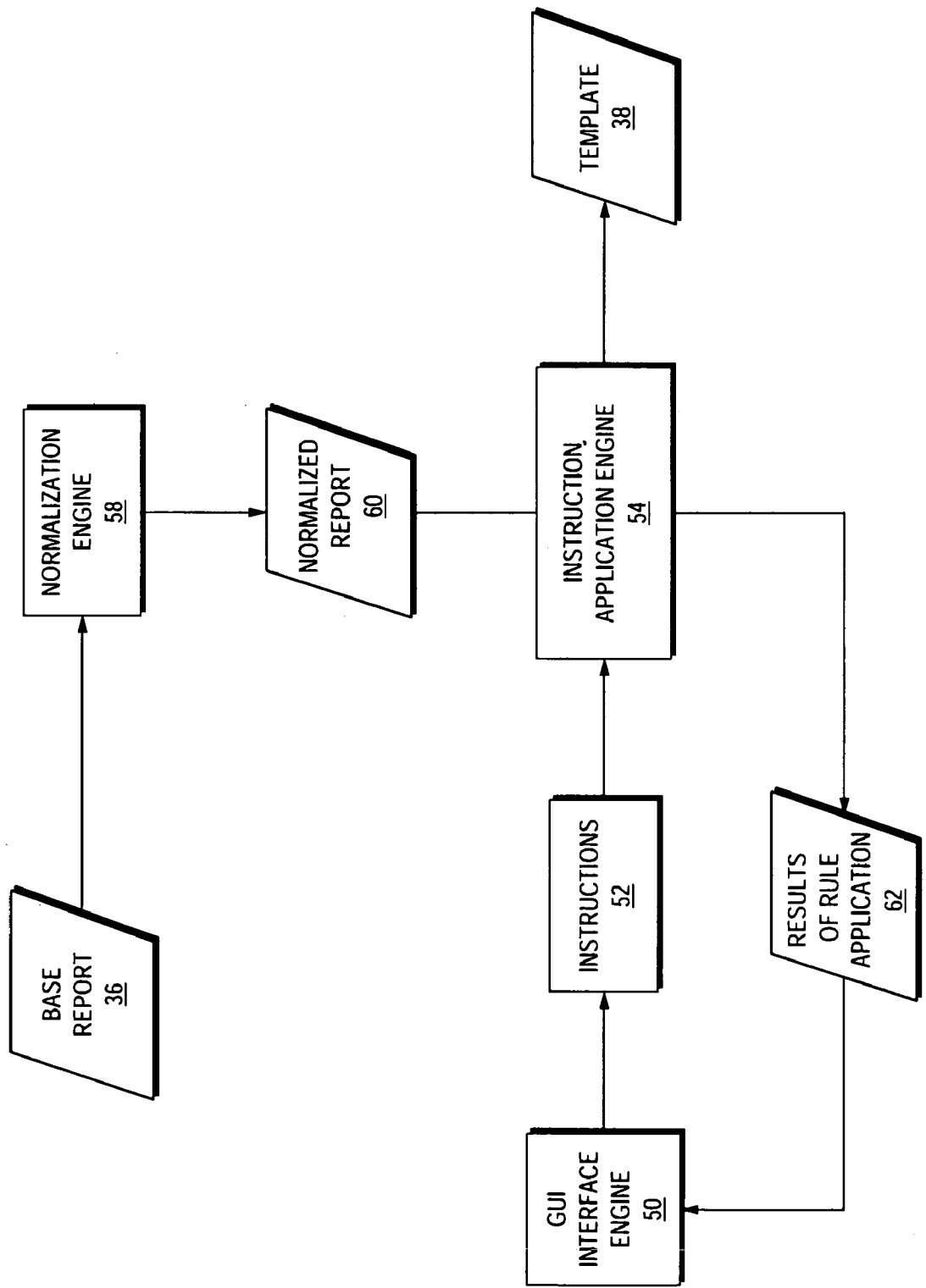
FIG. 3 is a block diagram illustrating operations of a template builder module of the system of FIG. 1.

The structure and operation of template builder module 30 and template runner module 32 will now be described in detail. Referring to FIG. 3, template builder module 30 includes a graphical user interface engine 50 which interacts with the user to obtain various extraction instructions to be incorporated into template 38. GUI interface engine 50 provides instructions 52, as they are entered by the user, to an instruction application engine 54. To create a template, a user selects a sample or base report 56 which is normalized by a normalization engine 58 to generate a normalized report 60 which is stored in memory in association with base report 56. Instruction execution engine 54 receives the normalized report 60 and applies the extraction instructions from GUI interface engine 50 and provides the results 62 of the extraction instruction execution process to GUI interface engine 50. GUI interface engine 50 displays the results so that the user can dynamically determine whether the extraction instructions 52 are achieving the desired results. After the user finishes entering the extraction instructions for generating template 38, instruction application engine 54 outputs template 38. The operation of GUI interface 50, normalization engine 58, and instruction application engine 54 will now be described in detail.

Figure 4:
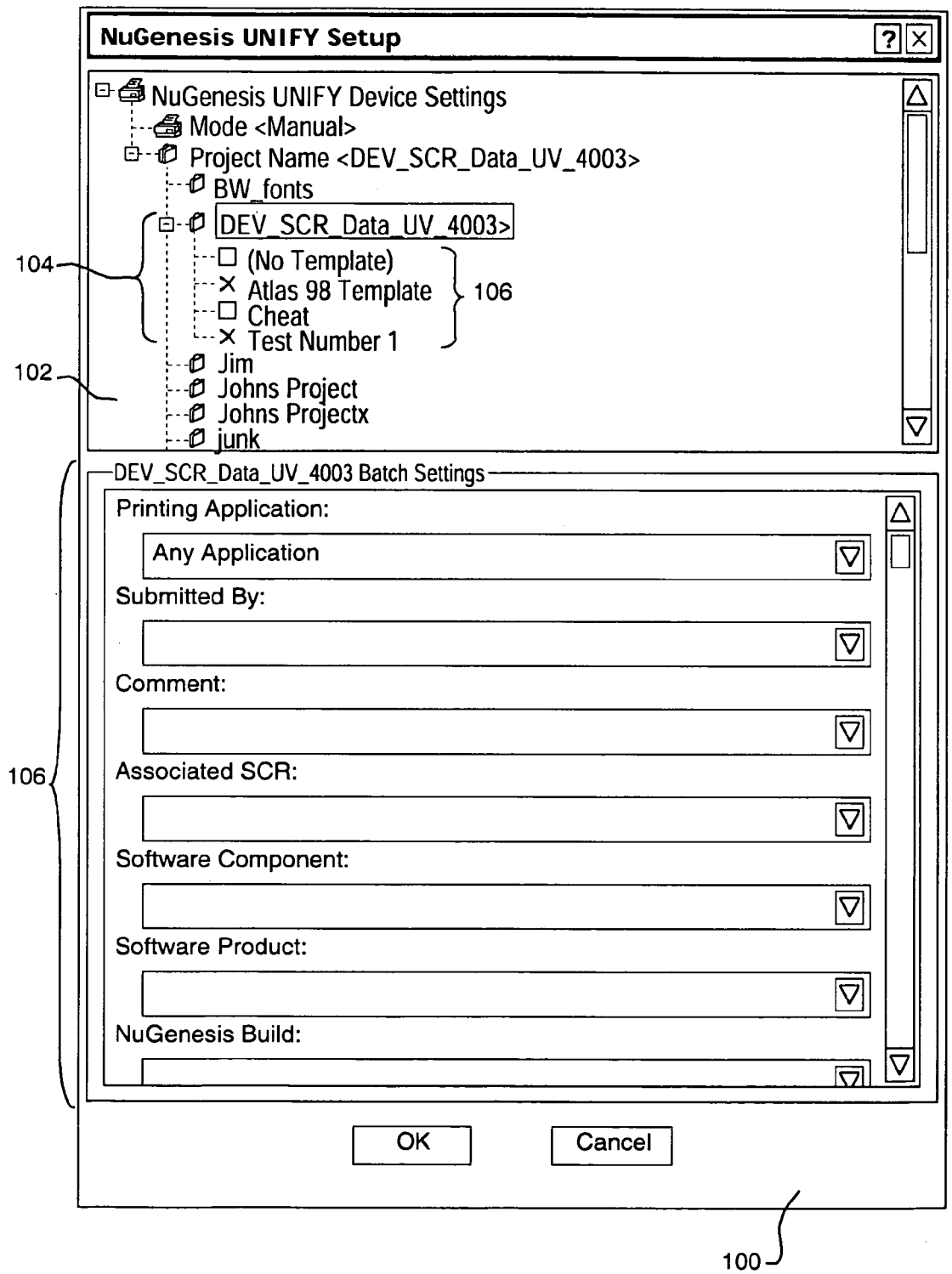
FIG. 4 is an illustration of a graphical user interface for managing projects in a project manager module of the system of FIG. 1.

Referring to FIG. 4, project manager module 16 first displays a graphical user interface 100 to the user. GUI 100 includes a project directory pane 102 which displays a tree directory of the various projects available to the user. Each project includes at least one batch of reports, which may be stored in database 20 or which are to be generated by report generating applications 12. A project can also include one or more templates. For example, project 104 includes four templates 106 and a set of reports to be generated. Region 106 displays settings associated with the batch of reports in a selected project.

Figure 4A:
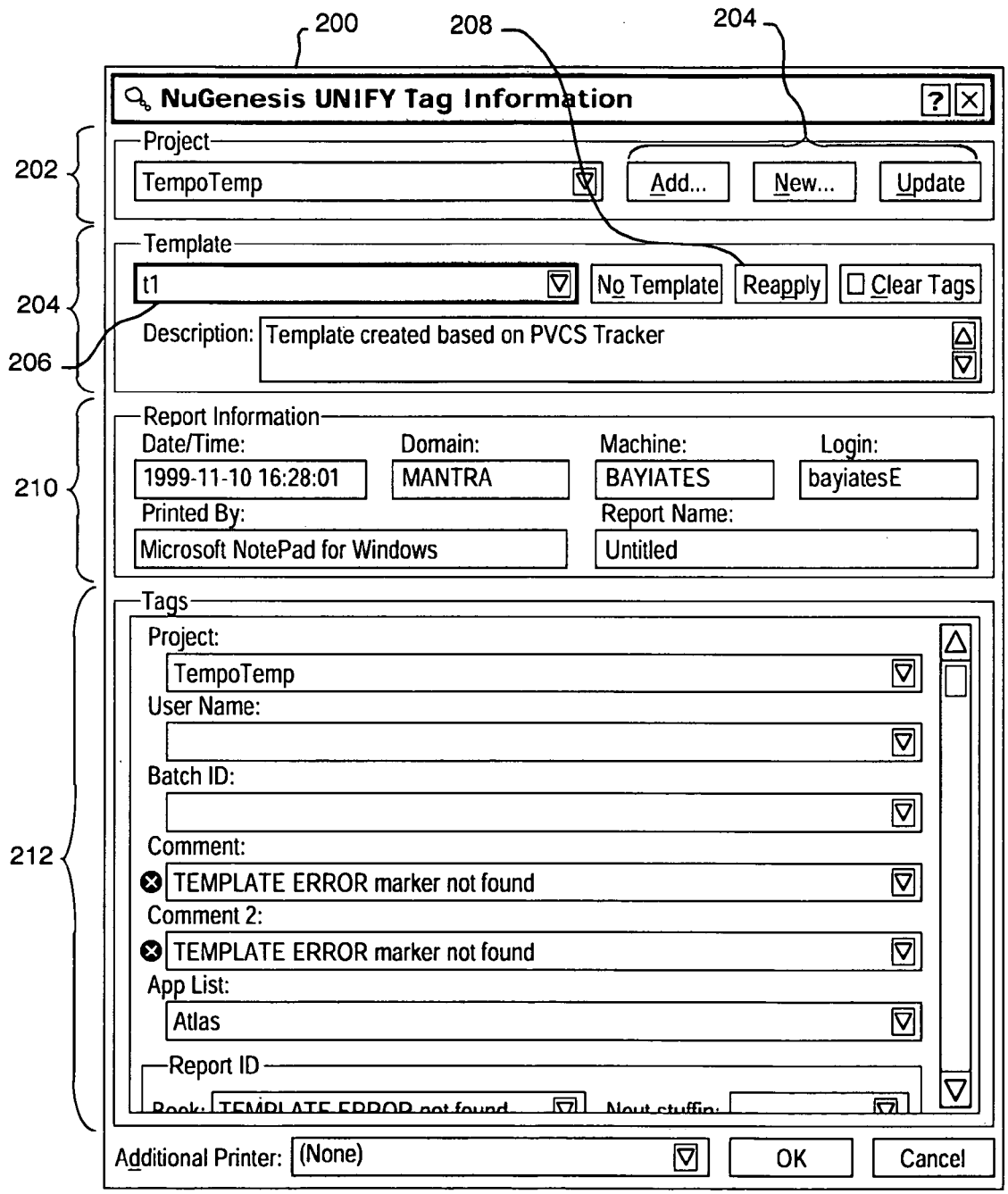
FIG. 4A is an illustration of a graphical user interface for selecting and applying templates.

Referring to FIG. 4A, upon selecting a project or a template, project manager module 16 displays a tag information GUI 200 to the user. GUI 200 displays in region 202, the project name and the various functions which may be performed on a project by pressing any one of buttons 204. Tag information GUI 200 further includes a template region 204 which provides a drop down menu 206 which includes various templates associated with the project. A button 208 allows a user to select to apply a template to a selected batch of reports. Region 210 displays the information associated with the sample or base report of the selected template. Region 212 includes the various tags for which the template extraction instructions are used to extract data.

Figure 5:
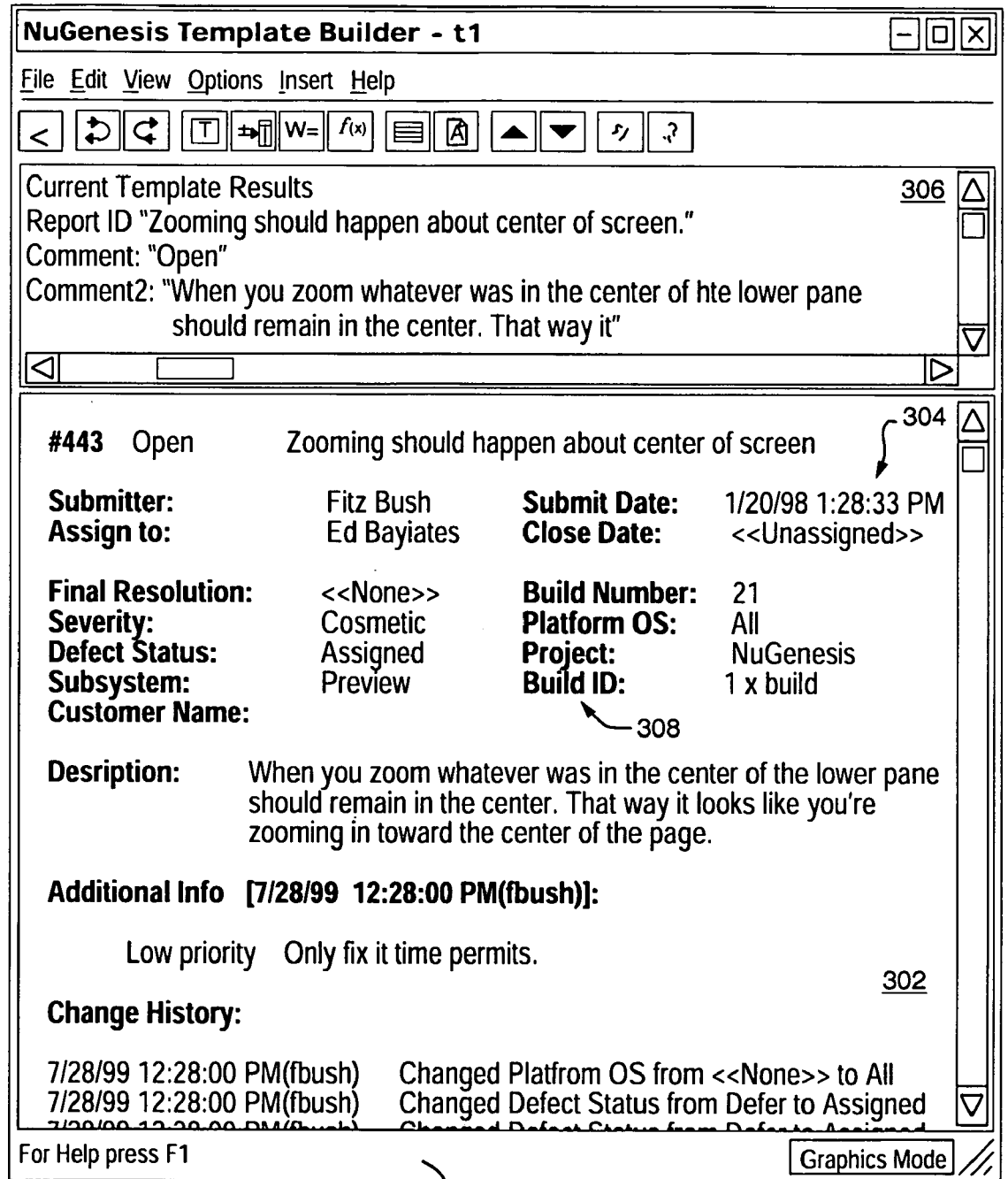
FIG. 5 is an illustration of a graphical user interface for creating or editing templates in the template builder module of the system of FIG. 1.

Referring to FIG. 5, template builder module 30 displays a template builder module graphical user interface 300 to the user for creating or editing a template. To create a template, the user first selects a report based on which the template is created. The selected report is displayed in a report display pane 302. To generate the template, the user then inputs the various extraction instructions for extracting data from the report.

Figure 6:
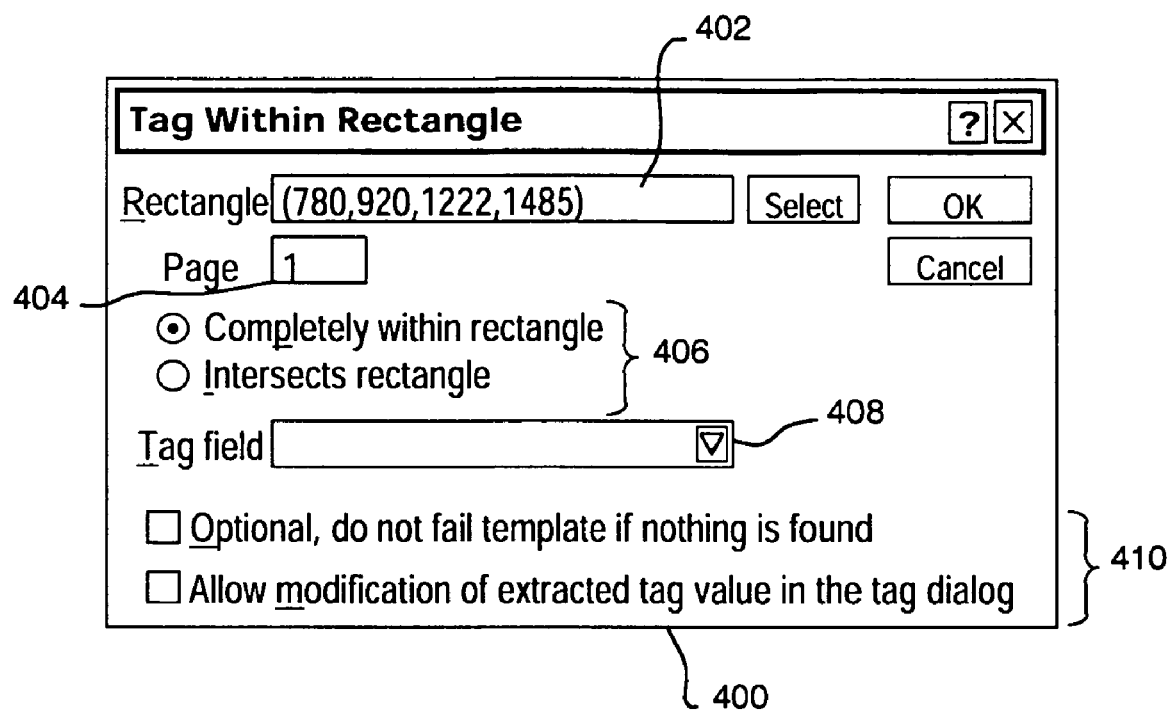
FIG. 6 is an illustration of a graphical user interface for creating or editing an extraction instruction for searching for a tag within a rectangle in the template builder module of the system of FIG. 1.

In the described embodiment, the user may input one or more extraction instructions selected among at least four types of extraction instructions. A first type of extraction instruction allows finding data in a particular area in the report and inserting the data into a selected tag in association with that report. To do so, a user can select a rectangle 304 by using a mouse and pointer combination and right clicking on the mouse to select the appropriate option from a displayed menu (not shown). Template builder module 30 then causes computer 16A to display a tag within a GUI 400 (shown in FIG. 6) to the user. Referring also to FIG. 6, GUI 400 includes a rectangle region 402 in which the coordinates of the rectangle in the displayed form of the report are displayed. In region 404, GUI 400 displays the page number within the report in which rectangle 304 appears. Note that the number of pages in a report can be thought as a dimension of the report. GUI 400 then provides the user with the option of including only the text that is completely within the rectangle or all text which intersects the rectangle (region 406). In tag field region 408, GUI 400 provides a drop down menu form which the user can select the name of the tag where the retrieved information will be inserted. In region 410, GUI 400 provides the user with the option of not failing the template (i.e., the option of continuing to apply the template despite an error condition), even if no text is found within the designated rectangle for a particular report and allowing modification of extracted tag values in a tag dialogue GUI 200 shown in FIG. 4A.

Figure 7:
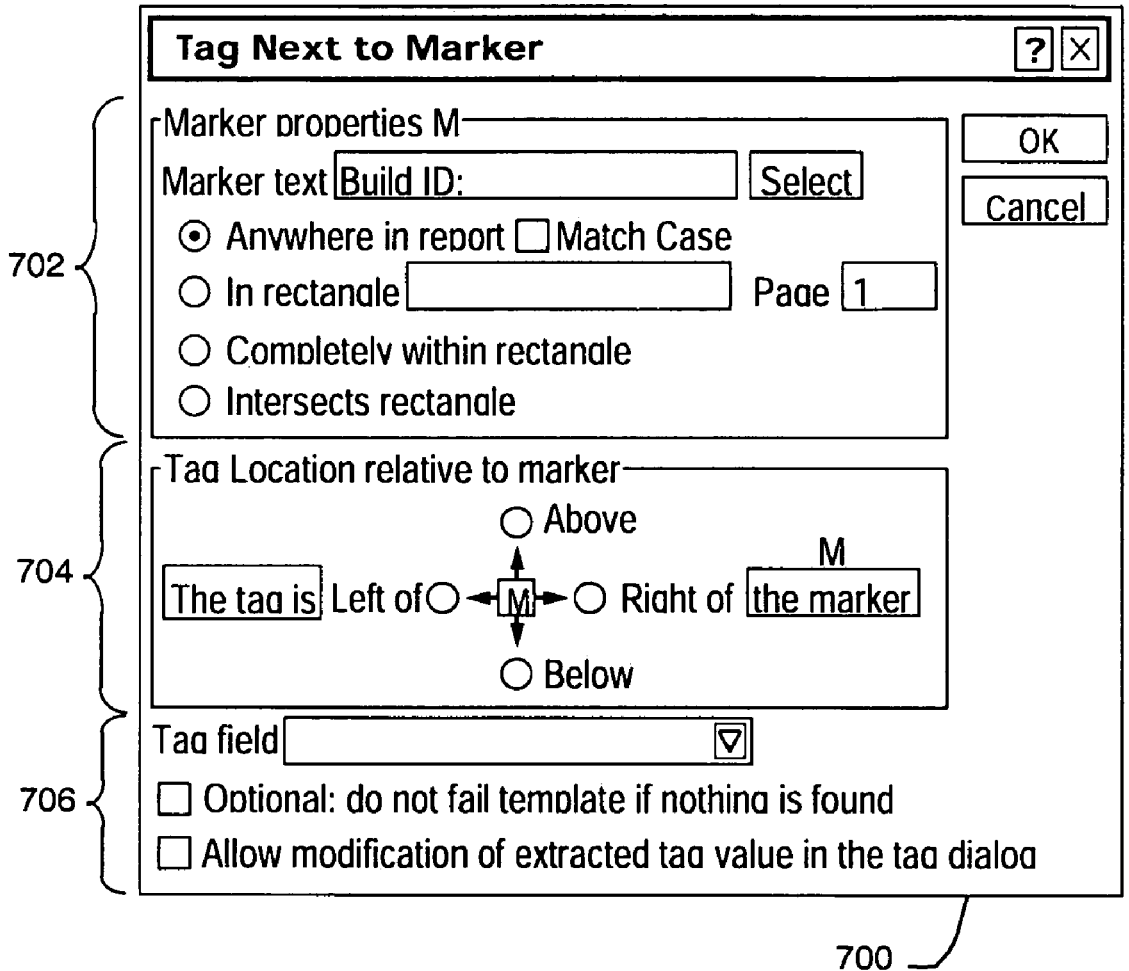
FIG. 7 is an illustration of a graphical user interface for creating or editing an extraction instruction for searching for a tag next to a marker in the template builder module of the system of FIG. 1.

Another type of extraction instruction allows finding data located in a direction relative to a selected reference point in the report and inserting the data into a selected tag in association with the report. A user can select a rectangle 308 by using a mouse and pointer combination and right clicking on the mouse to select the appropriate option from a displayed menu (not shown). Template builder module 30 then causes computer 16A to display a tag next to marker GUI 700 (shown in FIG. 7) to the user. Referring also to FIG. 7, GUI 700 includes a marker designation region 702 in which a user can select the manner in which the marker should be searched for in the report. The user may select to search for the marker in the entire report or in the selected rectangle 308 in the report. GUI 700 further includes a region 704 in which the direction of the location of the text to be included in the tag is relative to the marker can be designated. Direction can be designated in any one of the multiple dimensions of the report. Template builder module 30 uses the direction and a set of predetermined instructions to find text most likely intended by the user to be included in the tag field. In region 706, the user is provided with a pull down menu in which the user can select the tag field in which the text should be inserted. In region 706, GUI 700 provides the user with the option of not failing the template even if no text is found within the designated rectangle for a particular report and allowing modification of extracted tag values in a tag dialogue tag dialogue GUI 200 shown in FIG. 4A.

Figure 8:
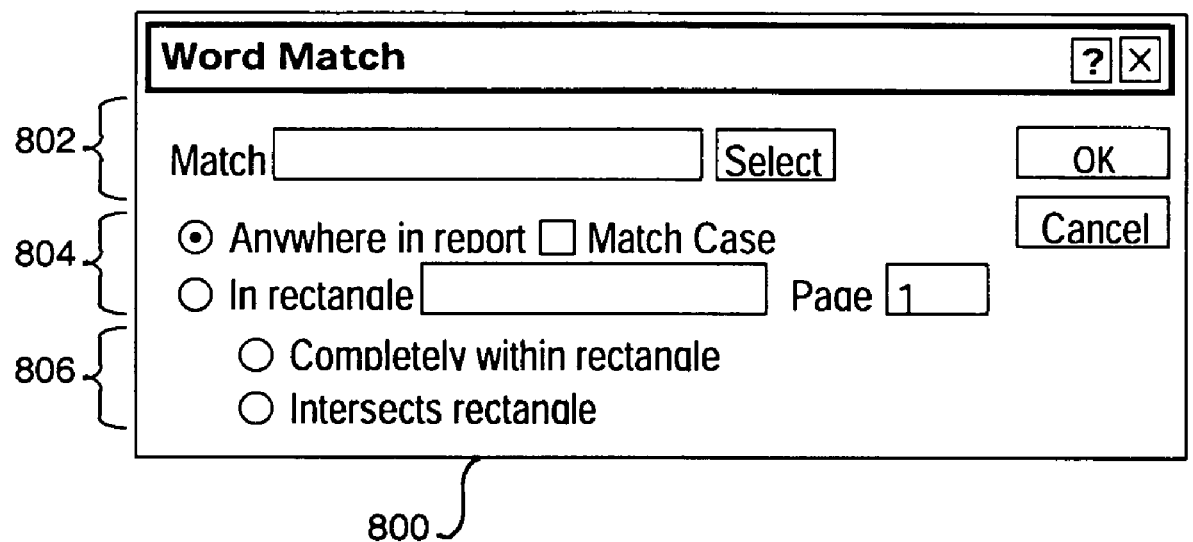
FIG. 8 is an illustration of a graphical user interface for creating or editing an extraction instruction for searching for a word match in the template builder module of the system of FIG. 1.

Another type of extraction instruction allows determining whether a particular word or phrase appears in a report and setting a Boolean tag in association with the report. To do so, a user can select a rectangle 308 by using a mouse and pointer combination and right clicking on the mouse to select the appropriate option from a displayed menu (not shown). Template builder module 30 then causes computer 16A to display a tag next to marker GUI 800 (shown in FIG. 8) to the user. Referring to FIG. 8, GUI 800 includes a region 802 for inserting the particular word or phrase to be searched for. In region 804 The marker may be searched for in the entire report or in the selected rectangle 308 in the report. The user may select in region 806 whether to search only within the rectangle or to search any text that intersects the rectangle, as was the case with the first type of extraction instruction. Additionally, the user may select to ignore upper/lower case differences.

Figure 9:
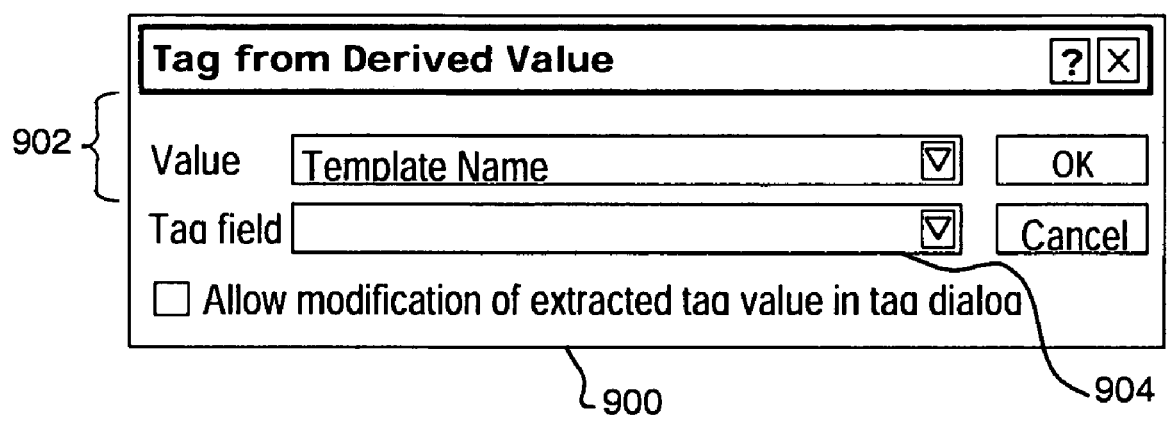
FIG. 9 is an illustration of a graphical user interface for creating or editing an extraction instruction for deriving a tag from searched for values in the template builder module of the system of FIG. 1.

Another type of extraction instruction allows inserting data into a selected tag in association with the report based on a value derived from data in the report. To do so, a user can right click on the mouse to select the appropriate option from a displayed menu (not shown). Template builder module 30 then causes computer 16A to display a tag from derived value GUI 900 (shown in FIG. 9) to the user. Referring to FIG. 9, in GUI 900, the user can select in region 902 how the value is derived and in region 904 the tag field in which the derived value should be inserted. The value may, for example, be derived based on functions such as mathematical functions performed on data extracted from the report.

Figure 10:
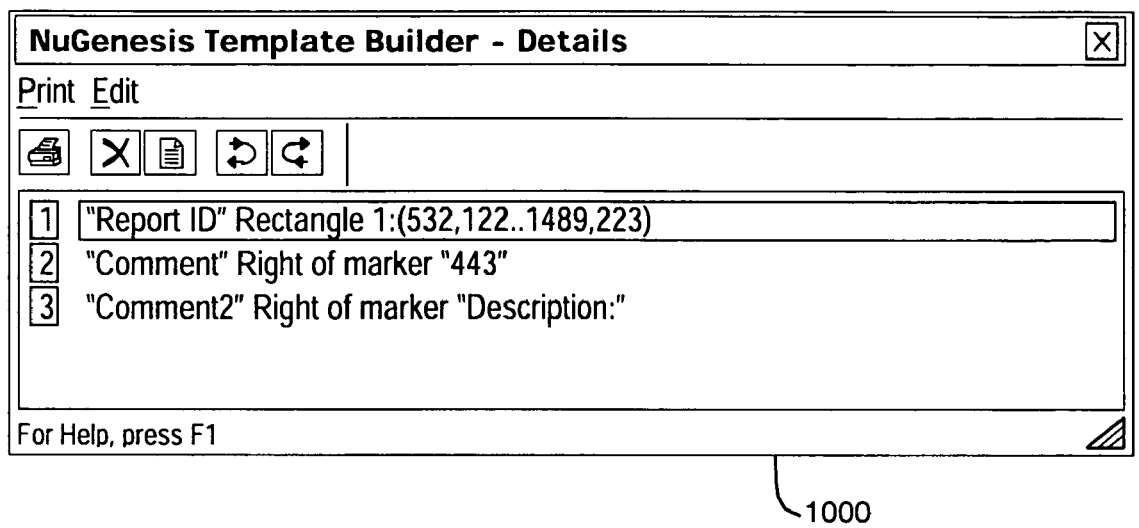
FIG. 10 is a schematic diagram of an embodiment of a data structure of a template.

Referring to FIG. 10, a user can review the extraction rules of a template in a template details GUI 1000 and select any one of them to edit.

Referring to FIGS. 3 and 6, as the user inputs each extraction instruction, instruction application engine applies the instruction to the sample report and supplies the results 62 to GUI engine 50. GUI engine 50 in turn displays the results pane 306 of GUI 300. This allows the user to monitor whether the extraction instruction resulted in the correct data being extracted from the sample report and whether the extraction instruction should be modified.

Figure 11:
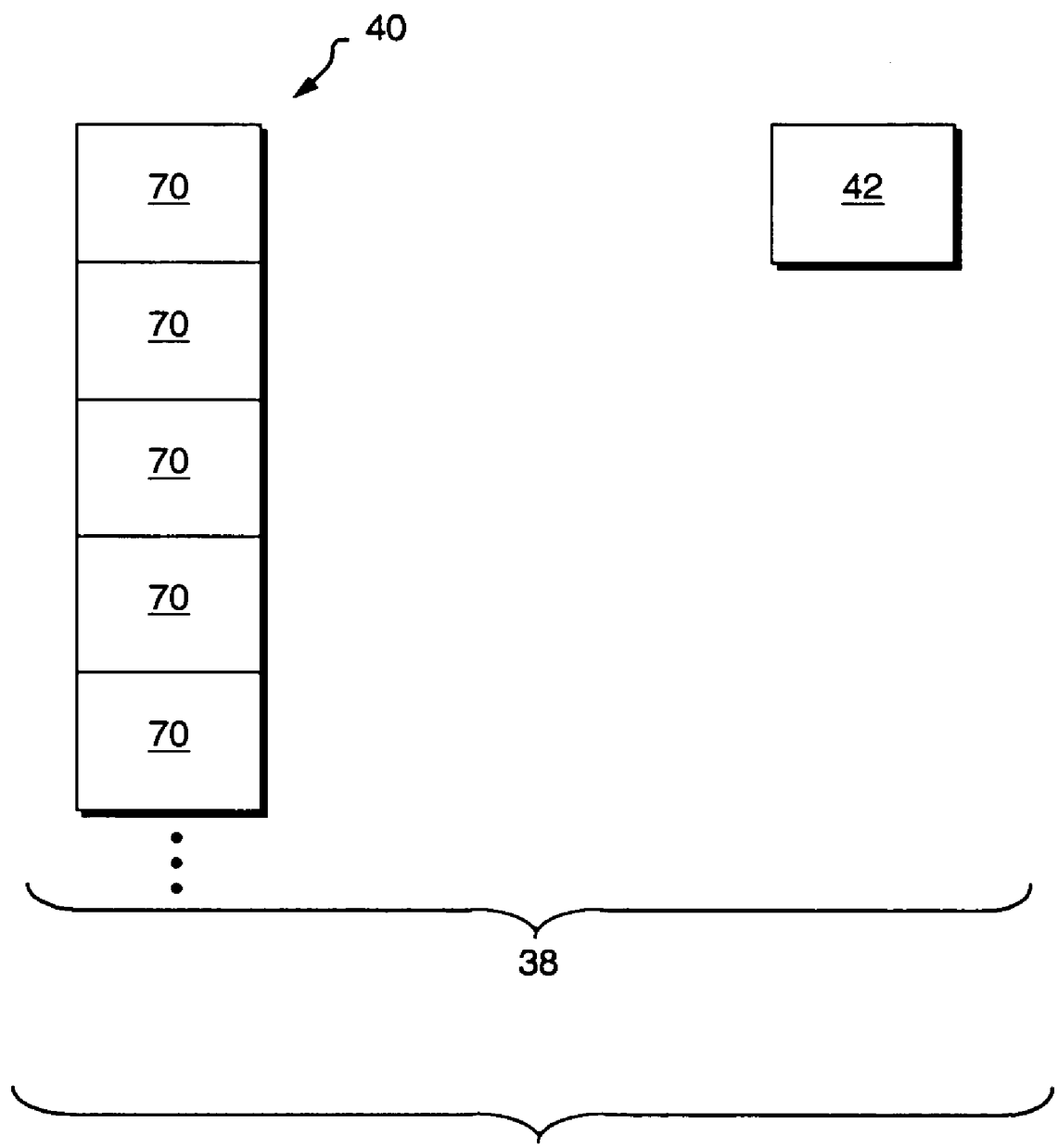
FIG. 11 is an illustration of a graphical user interface for listing extraction instructions of a template in the template builder module of the system of FIG. 1.
Figure 12:
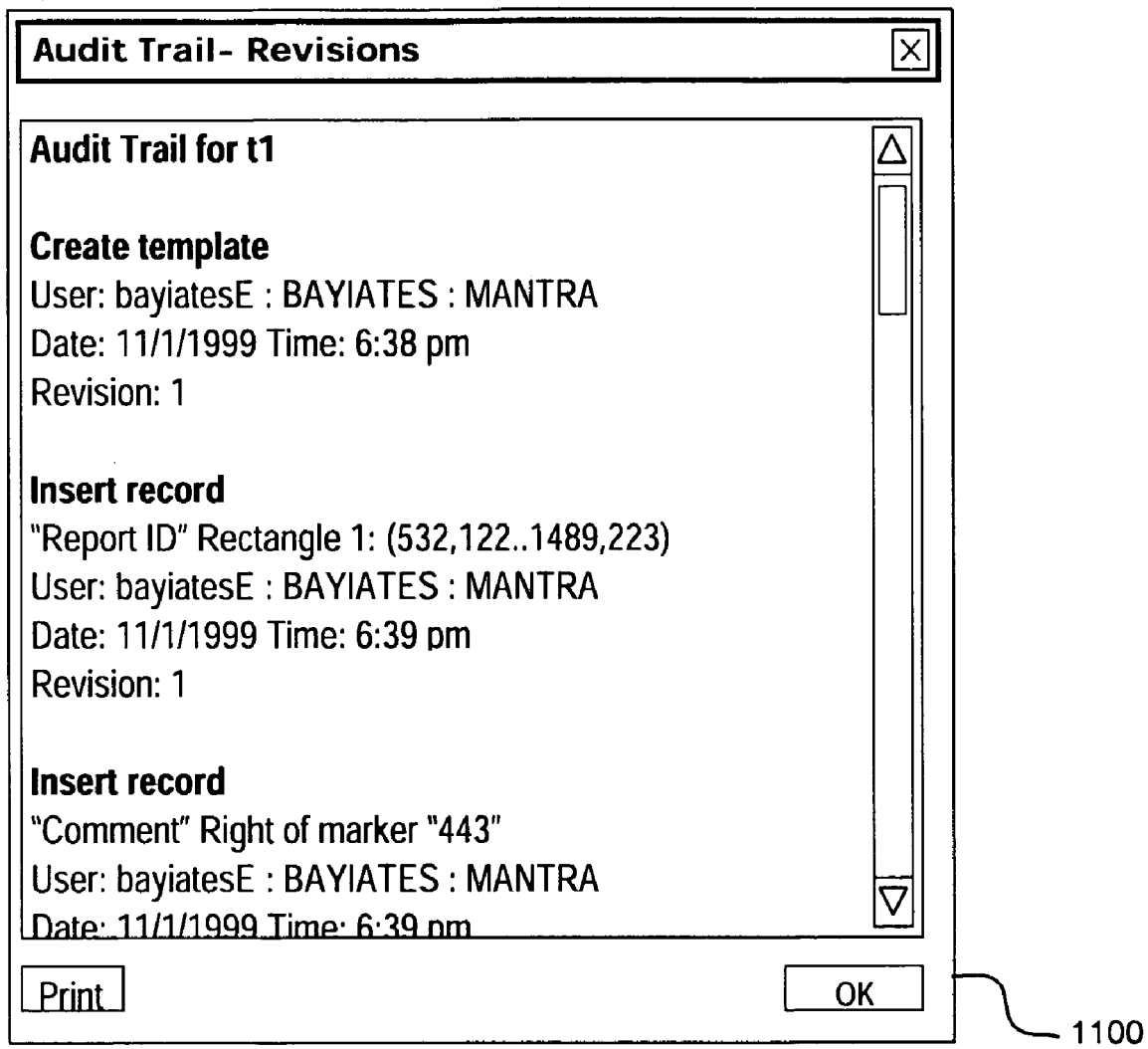
FIG. 12 is an illustration of a graphical user interface for displaying an audit trail in the template builder module of the system of FIG. 1.

Using these GUIs, the user can input the extraction instructions for a template to be used in processing a batch of reports. It should be noted that the same GUIs can be used for editing a template. After completing creating or editing a template, instruction application engine 54 outputs template 38. FIG. 11 is a block diagram of the data structure of template 38. As mentioned above in one embodiment, the data representing template 38 is structured to include a template edit component 40 and a template runtime component 42. Template edit component 40 includes a plurality of records 70. One record, which is the header record, stores identification information with respect to the template such as its name, date of creation, and so on. The header record also stores information with respect to the data structure of the template edit component such as the number of records in the template edit component. Another record 70 stores user input comments which may provide a description of the template. Another record stores the sample record to assist with future editing of the template. Yet another record stores the extraction instructions. FIG. 12 shows a GUI window 1000 for displaying the list of extraction instructions input by the user. The list shows the tag field to which an instruction applies and the extraction instruction for that tag field. The user can select any one of the instructions and edit the instructions.

Yet another record 70 in template edit component 40 stores an audit trail which is record of all the changes and edits made to the template. This record allows heightened security for ensuring data integrity which is important for regulatory purpose as, for example, in pharmaceutical industry for gaining FDA approvals. FIG. 12 shows a GUI window 1100 for displaying the audit trail.

Referring back to FIG. 3, having described in detail various graphical user interfaces used by template builder module 30 to interact with the user to obtain the template extraction instructions, we will now describe the manner in which template instruction application engine 54 processes the user input information to generate the template. One of the difficulties in generating the template is forming a correspondence between areas of the report selected by the user on a computer display and the data file representing the visual form of data. The size and coordinate values associated with the data in the data file, which stores the visual form of data for example as a vectored image, does not necessarily correspond to the size and coordinate values associated with the displayed visual form of data on the computer display. For example, a file representing visual forms of data includes a plurality of text strings. Each text string includes text and formatting information for displaying the text as part of the visual form of data. The formatting information generally determines the location of the text string in a displayed visual form of data, the size of the font, and other such formatting information. The formatting information also defines a rectangular space within the visual form of data for displaying the string. However, this information does not always correspond to the size and coordinates of the displayed visual form of data.

The manner in which the data file stores data also does not always support efficient and accurate searching or size and coordinate conversion. For example, we have observed that application programs 12 commonly generate within a single report strings with differing fonts, sizes, and coordinates. Text which one would expect to be included in one text string also may be split between two strings. For example, a single word may be split and placed into different text strings. A user selecting a rectangle on the computer screen, as discussed in reference to FIG. 6, also may assume he is selecting a single word or phrase. However, the text string storing that single word may store the word with trailing or leading white spaces. Hence, if the user, for example, selects to include only text that is completely within a selected rectangle, the text string in the data file may appear to be outside of the selected rectangle.

Hence, to support proper creation, editing, and application of templates, the reports are first normalized. The first step in normalizing the report is to ensure that all of the coordinate systems in the report use the coordinate systems used by the display system. In that case, performing matches between the text selected on the screen by the user and the text in the visual form of data can readily be done. To do so, normalization engine 58 scans the report and translates all of the coordinate references to those used by the display.

The second step preformed by the normalization engine 58 is to ensure that the size of the text string are scaled to correspond to the display size on the display device. Some operating systems, such as the Windows brand operating systems may not provide accurate information and/or accurate techniques for performing such scaling. Hence, for such operating systems, the scaling is optimized to correspond to the scale of the display string of the display device.

The third step performed by normalization engine 58 involves joining and splitting text strings so that each text string will contain a logical unit of text. For example, normalization engine 58 ensures that all words which have been split will be contained within single strings. In addition, normalization engine 58 ensures that words separated by more than three spaces are separated from each other. Leading and/or trailing spaces also are placed in their own individual text strings. Other instructions may be used to decide on whether to split or join text.

After performing these steps, normalization engine 58 generates a normalized report 60 which includes the base or sample report and a list of all normalized strings and their associated normalized size and location in the visual form of data. This allows a quick application of extraction instructions 52 by instruction application engine 54.

As each extraction instruction 52 is input by the user, instruction application engine 54 compares the various coordinate and location information of the instruction to the coordinate and location information associated with the strings in the list of normalized report 60 to find those text strings which are in the vicinity of coordinate information associated with the extraction instruction 52. After finding those text strings, instruction application engine 54 finds those text strings which satisfy the conditions of the instruction. instruction application engine applies a flexible standard in fulfilling the condition, because the manner in which the coordinates are specified by the user on the screen typically include some error. Matching the coordinates of the visual form of data after normalization to the coordinates on the screen also includes a degree of error. Hence, requiring only, for example, a 90% or 95% match, ensures that user extraction instructions are applied properly.

Figure 13:
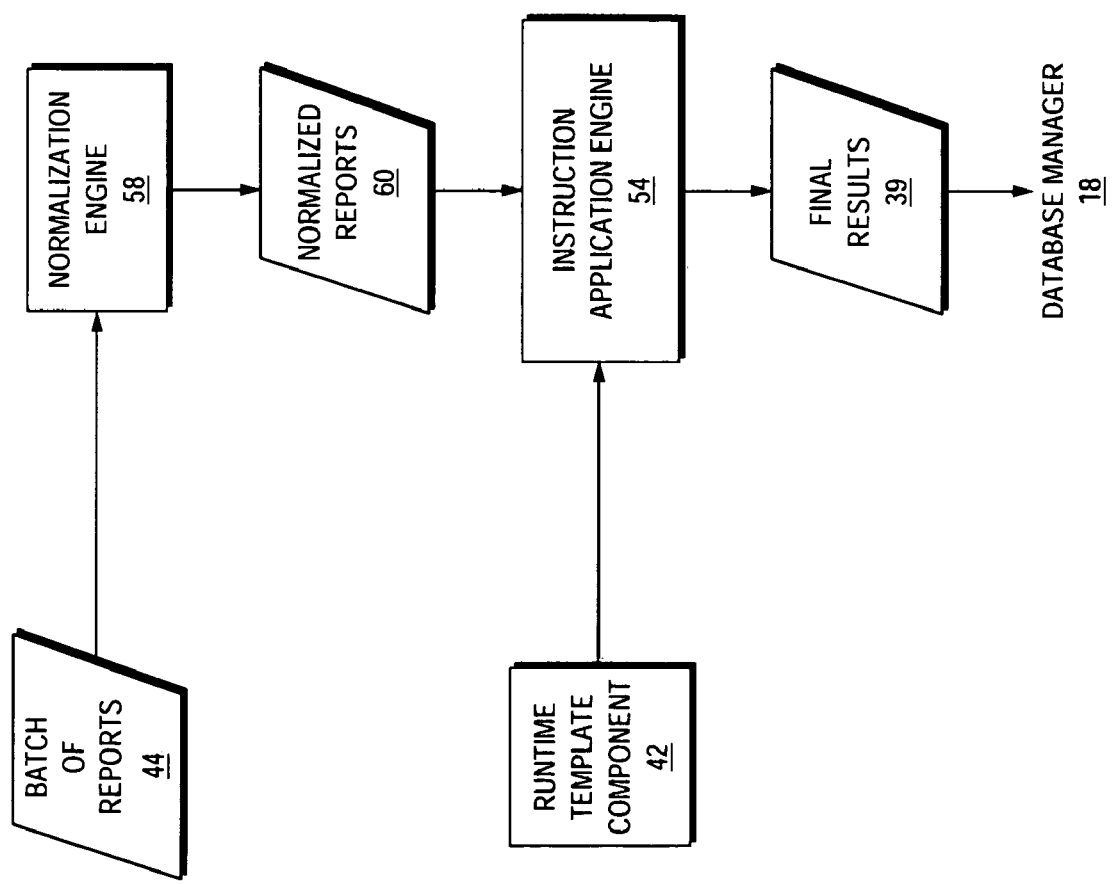
FIG. 13 is a block diagram illustrating operations of a template runner module of the system of FIG. 1.

Referring to FIGS. 3 and 13, having described the manner in which the templates are generated, we will now describe the structure and operation of template builder module 32. Template builder module 32 shares some of the modules of template builder module 30. For example, template builder module includes the normalization engine and the instruction application engine. As a batch of reports are received, normalization engine 58 normalizes each of the reports and provides each one of the normalized reports 60 to instruction application engine. 54. instruction application 54 retrieves runtime template component 42 of template 38 from database 20 and applies the extraction instructions to each report. If any errors occur during the application of template, instruction application module 54 may display the error to the user and request for an input by the user. After applying the template to a report, instruction application engine 54 outputs the final instruction application results to the database manager 18. The final result can be a database record for each one of the records (shown in FIG. 14) which associates the generated tags with the report from which the tags were generated.

For example, template 38 can not only include extraction instructions for extracting data from the report, but can also include information input by the user to be input into tags in accordance with methods and techniques described in the '019 application.

Template runner module 32 can run as an independent application program which does not support creating and editing templates, but supports manipulating projects and applying templates to batches of reports. Hence, templates can generated at a central location at an enterprise and applied by various users (for example, user 26 in FIG. 1). Vendors and developers can generate templates and sell runtime components of those templates to various enterprises.

In FIG. 1, although components of system 10 are shown to be connected via network 14, the components may be configured differently. For example, components of system 10 may operate on a single computer. Or, project manager module 16 and database manager 18 may operate on the same computer. Additionally, template runner module 32 may operate on the same computer with either project manager module 16 or database manager 18, or both. Network 14 can be an intranet (such as a local area network, a wide area network, or various combinations thereof), or the Internet, or combinations thereof.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the claims.

Other embodiments are also within the scope of the following claims.

For example, components of system 10 may operate on a single computer. Or, project manager module 16 and database manager 18 may operate on the same computer. Additionally, template runner module 32 may operate on the same computer with either project manager module 16 or database manager 18, or both. Network 14 can of course be an intranet (such as a local area network, a wide area network, or various combinations thereof), or the Internet, or combinations thereof.

What is claimed is:

1. A computer implemented method for processing a visual form of data comprising:
  receiving, by using a computer, data representing a visual form of data, the data received comprising content data and format data, wherein the format data is applied to the content data to produce the visual form of data;
  generating a template comprising one or more extraction instructions for identifying a portion of the content data included in the visual form of data and for creating one or more tags, wherein said one or more tags are produced using the portion of the content data and are associated with the received data, said one or more extraction instructions including a first extraction instruction that is one of a first type, a second type, a third type or a fourth type, said first type providing for finding said portion of the content data in a particular area having coordinates specified in the first extraction instruction and inserting said portion of the content data found into a tag that is specified in the first extraction instruction, said second type providing for locating said portion of the content data in a direction relative to a selected reference marker and inserting the portion of the content data located into a tag specified in the first extraction instruction, said third type providing for determining whether particular text appears in content data and setting a boolean tag specified in said first extraction instruction in accordance with whether said particular text is found in content data, said fourth type specifying how to determine a derived value from said portion of the content data and inserting said derived value into a tag specified in said first extraction instruction; and storing said template, and wherein said first extraction instruction is said second type and identifies that said selected reference marker is searched for within a defined region having specified coordinates and said first extraction instruction indicates that said selected reference marker is determined with respect to content data which at least intersects said defined region.

2. The method of claim 1, wherein said one or more extraction instructions include a second extraction instruction of said first type that extracts text represented in the visual form of data by searching for text completely within said particular area.

3. The method of claim 1, wherein said one or more extraction instructions include a second extraction instruction of said first type that extracts text represented in the visual form of data by searching for all text that at least intersects said particular area.

4. The method of claim 1, wherein said one or more extraction instructions include a second extraction instruction that is one of said first type, said second type, or said fourth type, and said first extraction instruction indicates whether to allow modification of data inserted into a tag specified in said first extraction instruction.

5. The method of claim 1, wherein said first extraction instruction indicates that said selected reference marker is determined with respect to content data completely within said defined region.

6. The method of claim 1, wherein said one or more extraction instructions include a second extraction instruction of said third type that specifies to search for the particular text with respect to content data in a defined region.

7. The method of claim 6, wherein said second extraction instruction indicates that the particular text is searched for with respect to content data completely within said defined region.

8. The method of claim 6, wherein said second extraction instruction indicates that the particular text is searched for with respect to content data that at least intersects said defined region.

9. The method of claim 1, wherein said first extraction instruction is said fourth type and said derived value is determined by applying a mathematical function identified in said first extraction instruction to said portion of content data.

10. The method of claim 1, wherein said template includes extraction instructions each being a different one of said first type, said second type, said third type, and said fourth type.

11. The method of claim 1, wherein said template includes at least one extraction instruction that extracts content data and associated format data.

12. The method of claim 1, further comprising:
displaying a graphical user interface to a user to obtain said one or more extraction instructions through one or more user interactions.

13. The method of claim 12, wherein said one or more extraction instructions include a second extraction instruction of said first type and the method further comprising:
displaying said visual form of data received on a display;
selecting a first display region of said display; and
using said first display region to determine said particular area of said second extraction instruction.

14. The method of claim 12, the method further comprising:
displaying said visual form of data received on a display;
selecting a first display region of said display; and
determining a second portion of content data in said first display region and using said second portion of content data as said selected reference marker.

15. The method of claim 1, further comprising:
applying said template to said visual form of data to identify said portion of content data used in generating said one or more tags.

16. The method of claim 15, wherein said template is applied to the received data from an application in real time while said application is generating said data.

17. The method of claim 15, wherein said template is applied to data retrieved from a database.

18. The method of claim 1, wherein said one or more extraction instructions include a second extraction instruction that is said first type or said second type, and said second extraction instruction indicates whether to continue to apply the template if an error condition results from said second extraction instruction.

19. A system for processing a visual form of data comprising:
a processor;
a memory;
and executable code stored on a non-transitory computer readable storage medium, the non-transitory computer readable storage medium comprising executable code for:
receiving, data representing a visual form of data, the data received comprising content data and format data, wherein the format data is applied to the content data to produce the visual form of data;
generating a template comprising one or more extraction instructions for identifying a portion of the content data included in the visual form of data and for creating one or more tags, wherein said one or more tags are produced using the portion of the content data and are associated with the received data, said one or more extraction instructions including a first extraction instruction that is one of a first type, a second type, a third type or a fourth type, said first type providing for finding said portion of the content data in a particular area having coordinates specified in the first extraction instruction and inserting said portion of the content data found into a tag that is specified in the first extraction instruction, said second type providing for locating said portion of the content data in a direction relative to a selected reference marker and inserting the portion of the content data located into a tag specified in the first extraction instruction, said third type providing for determining whether particular text appears in said content data and setting a boolean tag specified in said first extraction instruction in accordance with whether said particular text is found in said content data, said fourth type specifying how to determine a derived value from said portion of the content data and inserting said derived value into a tag specified in said first extraction instruction; and storing said template, and wherein said first extraction instruction is said second type and identifies that said selected reference marker is searched for within a defined region having specified coordinates and said first extraction instruction indicates that said selected reference marker is determined with respect to content data which at least intersects said defined region.

20. The system of claim 19, wherein the non-transitory computer readable storage medium further includes executable code for an application that generates said data, wherein said data is sent to a database manager or a template runner.

21. The system of claim 19, wherein a normalization engine performs processing including translating coordinate references in said data to other coordinate references in accordance with a display device and ensuring that sizes of text strings in said data are scaled to correspond to a display size of said display device.

22. The system of claim 19, wherein a template builder provides one or more graphical user interfaces, and wherein said template builder includes a graphical user interface engine for displaying said one or more graphical user interfaces and obtaining said one or more extraction instructions through user interactions.

23. The system of claim 20, wherein said template runner provides for storing one or more user inputs as one or more corresponding user input tags associated with said data.

24. A non-transitory computer readable storage medium comprising executable code stored thereon for processing a visual form of data, the non-transitory computer readable storage medium comprising executable code for:

receiving data representing a visual form of data, the received data comprising content data and format data, wherein the format data is applied to the content data to produce the visual form of data;

generating a template comprising one or more extraction instructions for identifying a portion of the content data included in the visual form of data and for creating one or more tags, wherein said one or more tags are produced using the portion of the content data and are associated with the received data, said one or more extraction instructions including a first extraction instruction that is one of a first type, a second type, a third type or a fourth type, said first type providing for finding said portion of the content data in a particular area having coordinates specified in the first extraction instruction and inserting said portion of the content data found into a tag that is specified in the first extraction instruction, said second type providing for locating said portion of the content data in a direction relative to a selected reference marker and inserting the portion of the content data located into a tag specified in the first extraction instruction, said third type providing for determining whether particular text appears in content data and setting a boolean tag specified in said first extraction instruction in accordance with whether said particular text is found in content data, said fourth type specifying how to determine a derived value from said portion of the content data and inserting said derived value into a tag specified in said first extraction instruction; and storing said template, and wherein said first extraction instruction is said second type and identifies that said selected reference marker is searched for within a defined region having specified coordinates and said first extraction instruction indicates that said selected reference marker is determined with respect to content data which at least intersects said defined region.

* * * * *